United States Patent Office 2,724,172
Patented Nov. 22, 1955

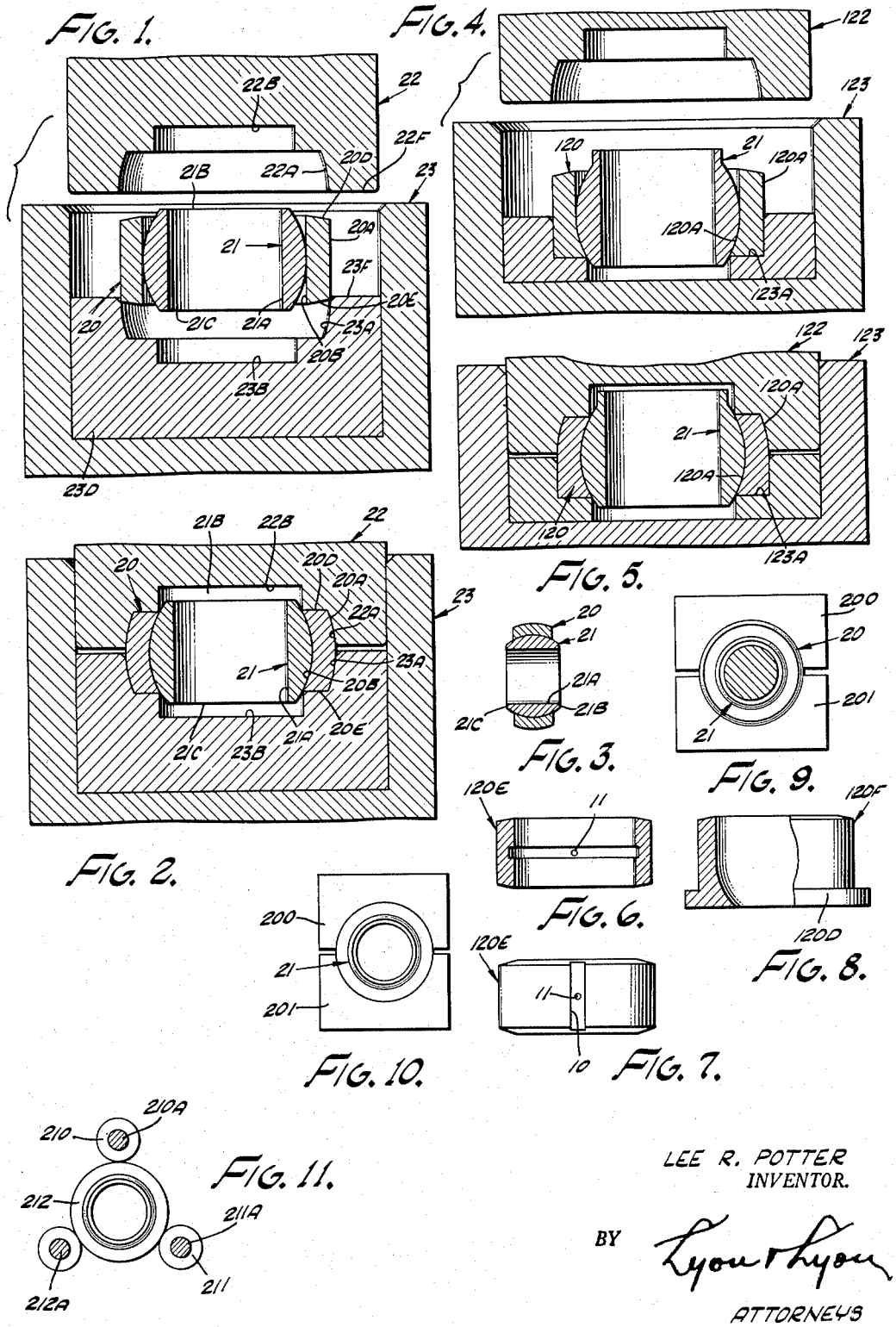

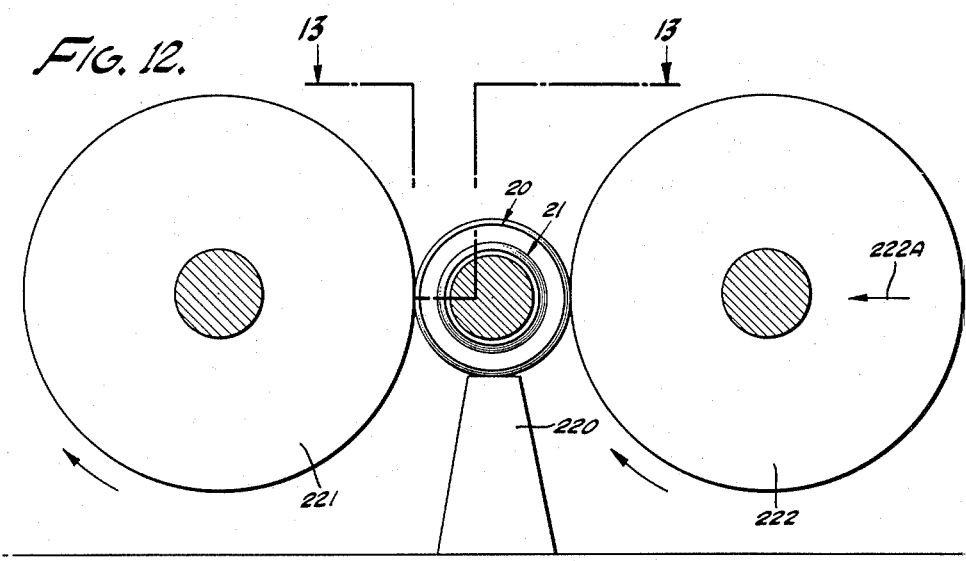
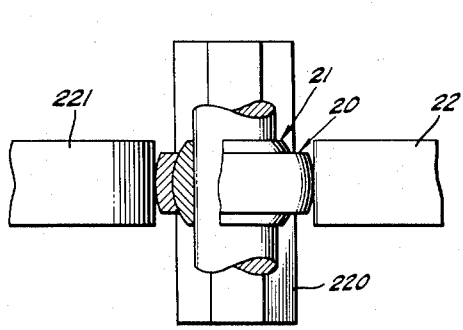
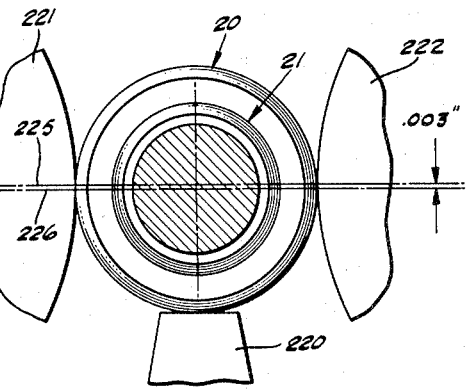
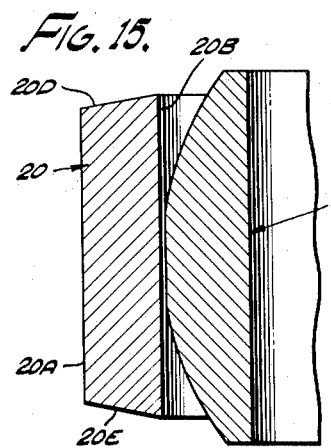
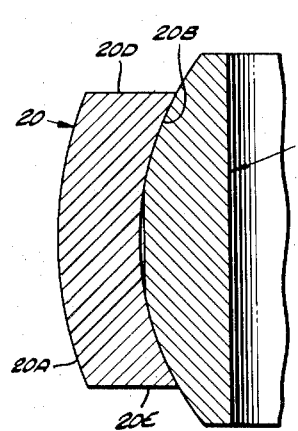
LEE R. POTTER
INVENTOR.

2,724,172

METHOD OF FORMING A SELF-ALIGNING BEARING

Lee R. Potter, Pasadena, Calif., assignor to Southwest Products Co., Duarte, Calif., a corporation of California Original application July 23, 1945, Serial No. 606,678, now Patent No. 2,626,841, dated January 27, 1953. Divided and this application December 16, 1952, Serial No. 326,294

7 Claims. (Cl. 29—149.5)

The present invention relates to the manufacture of self-aligning bearings of that type which employs a spherical body in or upon a shaft, pinion or other work transmitting element, the present application being a continuation-in-part of my copending application Serial No. 767,496, filed August 8, 1947 now abandoned in favor of the present application which is a division of my application, Serial No. 606,678, filed July 23, 1945 now U. S. Patent 2,626,841, patented January 27, 1953.

Bearings of this general type are commonly employed for pivotally, revolvably or slidably supporting rods, shafts, pinions and other mechanical elements.

One of the objects of the present invention is to provide a method of forming a spherical self-aligning bearing which is simple and inexpensive in construction and in which a ball element is freely journaled and securely held without lost motion, whereby the rod, shaft or other element is maintained in aligned position to provide free movement without binding.

In general, the present invention contemplates forming a bearing race by essentially a coining operation over a bearing ball such that the contact surfaces conform and produce a tight connection, the connection being sufficiently tight that the ball is no longer free to move in the formed race. Since the ball is thus not free to move, the present invention contemplates as an additional step an operation whereby the ball race is mechanically expanded evenly in such manner as to produce sufficient bearing clearance and freedom without any undesirable looseness, whereby the resulting bearing structure includes the spherical bearing ball and bearing race cooperating without waste play but yet free relatively to adjust themselves one with respect to the other.

A specific object of the present invention is to provide an improved technique whereby the ball race is coined around a spherical ball, i. e. the formed race is actually in binding relationship to the inner bearing ball so that the bearing ball is not free to move.

Another specific object of the present invention is to provide improved means and techniques whereby the race coined as described in the previous paragraph is freed from the ball in such a manner that there is a uniform separation between the ball and race.

For purposes of achieving the objects mentioned in the preceding two paragraphs, the specification herein discloses two different forms of race and die forming structures whereby the race is coined around the ball and, further, the specification shows various techniques for applying a subsequent rolling force to the outer race member to free the same from the ball.

Another specific object of the present invention is to provide improved means and techniques of this character applicable likewise to a novel bearing arrangement in which the bearing ball is provided with a circumferential flat surface so that an oil channel results in the fabricated bearing.

Another specific object of the present invention is to provide improved means and techniques of this character in which, after the coining operation, the outer race member is stressed such that the metal adjacent the inner peripheral surface area is compressed and the metal adjacent the outer peripheral surface is tensioned.

Another specific object of the present invention is to provide novel means and teachings for freeing the outer race member from the inner bearing ball when the outer race member is stressed as set forth in the previous paragraph.

Another specific object of the present invention is to provide improved means and techniques which involve the establishment of stresses of predetermined character in an outer race member during a coining operation and subsequent relieving of such stresses at the time the outer race member is being freed from the ball.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figures 1 and 2 illustrate progressive steps in the coining of the outer race member about the inner bearing ball;

Figure 3 illustrates a cross-sectional view of a bearing after it has been formed by the steps illustrated in Figure 2;

Figures 4 and 5 illustrate progressive steps in another coining operation involving a different type of race and a different type of die structure;

Figures 6 and 7 illustrate respectively a sectional view and a view in elevation of a race member which may be used in the coining processes shown either in Figures 1 and 2, on the one hand, or in Figures 15 and 16 on the other hand, it being noted that the race member in Figure 7 is originally machined to provide the axial groove 10 and radial oil channel 11 through which lubrication may flow into an oil channel formed between the bearing and race, as illustrated more specifically in connection with Figures 15 and 16;

Figure 8 shows a modified race member which may be used in connection with the dies illustrated in Figures 4 and 5;

Figures 9, 10, 11, 12, 13, and 14 illustrate various means and techniques which may be used to free the coined race member from the ball and to relieve stresses in the coined race member;

Figure 13 is a view taken along the line 13—13 of Figure 12;

Figure 14 is an enlarged view of the arrangement shown in Figure 12 for purposes of illustrating the fact that a line joining the rotational axes of the rolls is above the center of the composite bearing structure;

Figures 15 and 16 show in enlarged form a bearing structure used in connection with the dies shown in Figures 1 and 2, the inner bearing ball in this instance, however, being provided with an annular flat surface which alternately defines one wall of an annular lubrication channel.

Referring to the arrangements shown in Figures 1 and 2, which serve to perform coining operations on the outer race member 20, there is provided a pair of cooperating dies 22 and 23. The outer race member 20 has inserted therein the inner bearing ball 21, such bearing ball 21 in Figure 1 being retained in the outer race member 20 by frictional forces developed between such bearing ball 21 and the outer race member 20, it being thus noted that no additional means are necessary for maintaining the bearing ball 21 with respect to the outer race member. Of further significance is the fact that the die structure does not incorporate any means whereby the axial passage or bore 21A in the bearing ball is held in aligned position with respect to the race member. The finished bearing, as illustrated in Figure 3, includes, of course, only the outer race member 20 and inner bearing ball 21. The bore 21A serves ultimately to receive a ball pin or other fastening means which, when desired, may permit sliding or universal movement according to the use to which the composite bearing is applied. The bearing ball 21 is preferably spherical or may be of other shape and is made of relatively hard material such as steel and is provided with a smoothly finished surface of curved contour excepting end portions which, as shown, are omitted to produce a pair of oppositely disposed flats 21B, 21C. The bearing ball 21 is mounted in a single piece annular bearing race 20 which resembles a collar having an outer cylindrical surface 20A and an inner cylindrical raceway surface 20B, such outer and inner cylindrical surfaces 20A, 20B being contiguous with the annular faces 20D, 20E. The annular faces 20D and 20E are inclined downwardly and outwardly with respect to the center of the race member 20 so that, ultimately, such annular faces 20D and 20E in the finished product extend parallel to an axis passing radially of the composite bearing.

The bearing race is preferably made of ductile, malleable material such as brass or other metal which can be readily formed by pressing or swaging and later elongated.

As mentioned previously, in Figure 1 the bearing ball 21 is frictionally held within the outer race member 20 and the assembled structure rests on the lower die structure 23, with the cylindrical face 20A of the race disposed a slight amount within the curved dish-shaped die portion 23A. Since the ball 21 is loosely retained in the race 20, the dies 22 and 23 are placed in a press in which large impact forces are developed so that there is less likelihood for the ball 21 to move relative to the race during the coining operation, although it is recognized that if there is some slight movement between these two elements, the die structures are such that the ball assumes a center position with respect to the race member. It is observed that the upper die member 22 has an inverted dish-shaped portion 22A which may be considered complementary to the lower dish-shaped die portion 23A, since both the die portions 22A and 23A engage corresponding similar portions of the outer race member 20. It is observed that the dish-shaped die portions 22A, 23A are provided with a recessed floor 22B, 23B, respectively, so that clearance is provided, yet such floor portions 22B, 23B serve another purpose in that they may engage in turn the inner bearing ball 21 in the event that the bore of the bearing ball 21 is skewed somewhat. Of importance is the fact that the finished structure resulting from the operations illustrated in Figures 1 and 2 is an outer race member 20 coined around the inner bearing ball 21, i. e., since a coining operation is involved, the race member 20 is frozen in the inner bearing ball 21, requiring subsequent ball freeing operations which are described hereinafter. Of further importance is the fact that, at this stage, the outer race member 20 is stressed in a predetermined manner such that the metal adjacent the inner peripheral surface area is compressed and the metal adjacent the outer peripheral surface is tensioned. This initial stressing of the race is used to advantage in the subsequent freeing of the race from the ball, as described hereinafter.

While Figures 1, 2, 15 and 16 illustrate the use of a race member 20 having an inner cylindrical surface, a modified race member 120, as illustrated in connection with Figures 4 and 5, may be used having a pre-formed curved ball retaining lip 120A, the curvature of which conforms substantially with the curvature of the inner bearing ball 21. The arrangements shown in Figures 4 and 5 involve different die elements 122 and 123. The die structure 123 is provided with a seat 123A upon which the outer race member rests, while the upper die member 122 is identical in structure with the die 22 shown in Figure 1 and functions in the same manner, namely, to contact the outer cylindrical surface 120A of the race member 120 to coin the upper portion of the race member 120 about the ball 21, as illustrated in Figure 5. Thus, while in Figure 1 frictional forces alone are depended upon to maintain the modified ball 21 in the race 20, the arrangement shown in Figure 4 uses a pre-formed seat 120A in the race member 120 for the same purpose. Further, the operations indicated both in Figures 1 and 2, on the one hand, and Figures 4 and 5 on the other hand, result in a coining of the outer race member about the inner bearing ball, i. e., a binding engagement between the race and bearing, the race being stressed so that the metal adjacent the inner peripheral surface area is compressed and the metal adjacent the outer peripheral surface is tensioned, all for the purpose of the subsequent relieving of stresses and in the facilitation of freeing the ball by means described hereinafter.

As mentioned previously in connection with the description of the figures, the outer race member 120E, shown in Figures 6 and 7, may be substituted for the outer race member 20A, illustrated in Figure 1, so that the same operations may be performed thereon as indicated in Figure 1. Also, the outer race member 120F, as illustrated in Figure 8, which has an annular flange 120D at its lower end, may be operated on in the same manner as illustrated in Figure 4 but, in such case, the lower die-retaining member 123 should be suitably formed to accommodate such lower annular flange 120D on the element illustrated in Figure 8.

In all such cases, as mentioned previously, there is a coining of the outer race member about the inner bearing ball, i. e. a binding engagement between the race and bearing exists. The arrangements subsequently described in connection with Figures 9, 10, 11, 12, 13 and 14 serve to illustrate different means and techniques whereby the outer race member may be freed from the ball. In Figure 9, the ball and outer race member which are bound together are rotated as a unit between two complementary members 200, 201, which are internally grooved to conform and to engage the outer circumferential area of the outer race member. While the unit is thus rotated within the elements 200, 201, they are abruptly moved together to relieve the stresses in the outer race member and to free the ball from the race member. For this purpose, the lower member 201 may rest on a table or other support, and a sharp blow is delivered to the upper member 200.

The ball-freeing arrangement illustrated in Figure 10 is identical with that described in Figure 9 but, in this case, the ball and race member both remain stationary and do not rotate as a unit. In Figure 11, the outer race member, with the ball bound therein, is rotated between three rollers 210, 211 and 212 which have their axes equally spaced on the circumference of the circle, and which exert a radial inward force against the outer race member, while it is rotated by such rollers. For this purpose, the shafts 210A and 211A upon which the rollers 210 and 211, respectively, rotate may be stationary, whereas the other shaft, 212A, upon which the roller 212 is mounted is movable radially inwardly so that stresses in the outer race member may be relieved and the race member freed from the ball. In the ball-freeing arrangements shown in Figures 12, 13 and 14, the outer race member, with the ball bound thereto, rests on a stationary support 220 and is rotated by two large driven rollers 221, 222. As illustrated in Figure 14, the horizontal line 225 which exists through the center of rotation of the rollers 221, 222 is spaced vertically a slight distance in the order of .003 inch above the horizontal line 226 which passes through the center of rotation of the composite bearing ball and outer race member. By this arrangement, the composite race member and bearing ball tend to move downwardly against the support 220 which, of course, resists such motion. Continued rotation of the rollers 221, 222 results in relieving of the stresses in the outer race member and freeing of the same from the ball.

With further respect to Figure 1, it is noted that the ball 21 need not necessarily be held as shown therein, but as a matter of fact, the ball 21 may rest in a multiplicity of positions so long as the center line 21K of the ball is not below the plane which passes through the lower edge of the race member, since during the coining operation the ball seeks its central position in the outer race member. The element 23 may in fact comprise only a sleeve serving to guide the movement of the upper die member 22, and the lower die member 23D as well as the element 23 may rest on a single solid base.

While Figure 13 shows the outer surface of the race member having its resulting curvature, oftentimes it may be more desirable to first machine as for example by grinding such outer surface until the bulged portion is reduced to a flat cylindrical shape after which the composite structure is subjected to the stress-relieving and ball-loosening operations.

It should also be observed that the adjacent faces 22F, 23F are separated by a distance not less than 1/32" or 1/64" after the coining operation to provide tolerance since the volume of material in any one of a batch of race members is not exactly identical, i. e., all of the applied forces are used to perform a useful effect on the race member. Because of this separation in die faces, an annular dimple may result on the external face of the race member and for that reason the machining operation mentioned in the preceding paragraph is resorted to prior to stress-relieving and ball-freeing.

For these and subsequent reasons, the outer surface of the race member is machined to provide a flat cylindrical surface for the stress-relieving and ball-freeing rollers.

The axis of the roller 221 in Figure 12 is fixed, but the axis of roller 222 is moved inwardly in the direction of the arrow 222A by a hydraulically operated mechanism which has either one of two types of control. The first control applies an inward predetermined maximum force which is not exceeded regardless of the extent of movement of the axis of roller 222; while alternately the second control, when used, serves to move the axis of roller 222 inwardly a predetermined distance regardless of the pressure developed.

It is understood also that it is optional to place a temporary cylindrical core member in the ball 21 for use in the coining operation to assure maintenance of the dimensions of the ball in those instances where it is suspected that the forces impressed on the outer race member would deform the ball.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. The method of forming a self-aligning bearing having a bearing ball and a relatively soft, ductile metal bearing race, said ball and race being formed with corresponding curved surfaces therebetween, comprising: assembling said ball in an annular blank having an inner cylindrical surface substantially corresponding in diameter with that of the bearing ball and having opposite end portions, compressing said end portions inwardly in intimate and direct contact with said ball to deform the cylindrical blank and place the same under a stress with the outer periphery stretched and the inner periphery under compression such that said blank will conform and produce a binding engagement around the curved surface of said ball, and finally compressing the median portion of the bearing race by pressure applied through rolling contact relieving some of the compression stress in the metal adjacent the inner periphery of said blank and elongating the bearing race evenly towards its opposite ends and separating evenly the bearing surfaces betwen the bearing ball and bearing race by an amount sufficient to permit smooth rotation therebetween but still confine said ball within said race.

2. The method of forming a self-aligning bearing having a bearing ball of hard material and a spherical bearing race of relatively soft, ductile material in which said ball is retained and journaled, comprising: assembling said ball in an annular bearing race blank having an inner cylindrical surface substantially corresponding in diameter with the diameter of the ball and having oppositely disposed radially converging ends, compressing said converging ends inwardly in intimate and direct contact with said ball to deform the cylindrical blank and place the same under a stress such that the outer periphery will be placed under a stretch tension and the inner periphery will be compressed to conform evenly with the perimeter of said ball and produce a longitudinal curved perimeter, and finally rolling the median portion between the ends of the bearing race inwardly under sufficient pressure relieving some of the compressive stress in the inner periphery of said blank and elongating the bearing race evenly to permit smooth rotation between said ball and bearing race but still confine said ball within said race.

3. In the method of forming a self-aligning bearing having a bearing ball and a spherical bearing race formed from a race blank, the steps comprising: coining said race blank around said ball in intimate and direct contact with said ball to produce a binding action between said ball and race blank such that the outer periphery of the race blank is placed under a stretch tension and the inner periphery is compressed to conform evenly with the perimeter of the ball and to produce a longitudinally curved spherical perimeter, and then rolling the conformed race blank under sufficient pressure to relieve some of the compressive stresses in the inner periphery of said blank to elongate the bearing race evenly and permit smooth rotation between said ball and said bearing race but still confine said ball within said race.

4. The method of forming a self-aligning bearing having a bearing ball and a relatively soft, ductile metal bearing race, said ball and race being formed with corresponding curved surfaces therebetween, comprising: assembling said ball in an annular blank having an inner cylindrical surface substantially corresponding in diameter with that of the bearing ball and having opposite end portions, compressing said end portions inwardly in intimate and direct contact with said ball to deform the cylindrical blank and place the same under a stress with the outer periphery stretched and the inner periphery under compression such that said blank will conform and produce a binding engagement around the curved surface of said ball, and finally compressing the median portion of the bearing race by pressure applied radially inwardly thereto relieving some of the compression stress in the metal adjacent the inner periphery of said blank and elongating the bearing race evenly towards its opposite ends and separating evenly the bearing surfaces between the bearing ball and bearing race by an amount sufficient to permit smooth rotation therebetween but still confine said ball within said race.

5. The method of claim 4 wherein said blank is initially formed with annular end surfaces of frusto-conical configuration such that pressing said opposite end portions of said blank inwardly into contact with said ball causes said annular end surfaces to become substantially parallel planar surfaces.

6. In the method of forming a self-aligning bearing having a bearing ball and a spherical bearing race formed from a race blank, the steps comprising: coining said race blank around said ball in intimate and direct contact with said ball to produce a binding action between said ball and race blank such that the outer periphery of the race blank is placed under a stretch tension and the inner periphery is compressed to conform evenly with the perimeter of the ball and to produce a longitudinally curved spherical perimeter, and then applying sufficient pressure radially inwardly to said race blank to relieve some of the compressive stresses in the inner periphery of said blank and elongating the bearing race evenly an amount sufficient to permit smooth rotation between said ball and said bearing race but still confine said ball within said race.

7. The method of claim 6 wherein said blank is initially formed with opposite end portions, each having an annular end surface of frusto-conical configuration such that coining said opposite end portions of said blank inwardly into contact with said ball causes said annular end surfaces to become substantially parallel planar surfaces.

References Cited in the file of this patent

UNITED STATES PATENTS

| | | |
|---|---|---|
| 1,693,748 | Fiegel | Dec. 4, 1928 |
| 1,918,690 | Engelhardt | July 18, 1933 |
| 2,382,773 | Chambers | Aug. 14, 1945 |
| 2,462,138 | Spagenberg | Feb. 22, 1949 |
| 2,464,492 | Dimick | Mar. 15, 1949 |
| 2,476,728 | Heim | July 19, 1949 |
| 2,480,043 | Paulus | Aug. 23, 1949 |
| 2,626,841 | Potter | Jan. 27, 1953 |